United States Patent [19]
Kono et al.

[11] Patent Number: 4,960,089
[45] Date of Patent: Oct. 2, 1990

[54] COMBUSTION SYSTEM

[75] Inventors: Michikata Kono, Tokyo; Yoshiyuki Wada, Chiba; Tetuya Kamihara, Kanagawa; Masahito Tatematsu; Koichi Suda, both of Aichi, all of Japan

[73] Assignee: Aisan Kogyo Kabushiki Kaisha, Aichi, Japan

[21] Appl. No.: 438,390

[22] Filed: Nov. 20, 1989

[30] Foreign Application Priority Data

Nov. 28, 1988 [JP] Japan ................. 63-298196
Nov. 7, 1989 [JP] Japan ................. 1-289438

[51] Int. Cl.⁵ ............... F02B 19/00; F02P 15/00
[52] U.S. Cl. .................... 123/260; 123/253
[58] Field of Search ............ 123/260, 253, 143 B, 123/169 EL, 169 G

[56] References Cited
U.S. PATENT DOCUMENTS

2,979,043 4/1961 Meurer et al. ................. 123/253
4,041,922 8/1977 Abe et al. .................... 123/143 B
4,493,297 1/1985 McIlwam et al. .............. 123/143 B
4,693,218 9/1987 Nagakura .................... 123/260
4,793,305 12/1988 Joyce ....................... 123/260
4,852,529 8/1989 Vowles ...................... 123/143 B
4,913,111 4/1990 Amga ....................... 123/260

Primary Examiner—Raymond A. Nelli
Attorney, Agent, or Firm—Blum Kaplan

[57] ABSTRACT

A fuel supply/ignition device for use with a stratified combustion system includes a fuel chamber formed adjacent to a combustion chamber. The fuel chamber is provided with a valve for supplying a liquid fuel and a spark plug for generating a spark. The spark plug is connected to a high-energy generator. When the liquid fuel is charged into the fuel chamber, and a high-energy discharge is generated by the spark plug, the liquid fuel in the fuel chamber is atomized to be sprayed into the combustion chamber, and is simultaneously ignited to provide stratified combustion. Application of the fuel supply/ignition device to an internal combustion engine contributes to a reduction in harmful components such as HC and NOx in an exhaust gas.

8 Claims, 12 Drawing Sheets

COMBUSTION SYSTEM

BACKGROUND OF THE INVENTION

Field of the Invention

The present invention relates to a combustion system, and more particularly to a fuel supply/ignition device and an internal combustion engine utilizing this device.

Various systems of stratified combustion have been proposed such that a rich fuel mixture layer and a lean fuel mixture layer are formed in a cylinder of the internal combustion engine, and a flame generated by igniting the rich fuel mixture layer is propagated to the lean fuel mixture layer to burn a generally lean fuel mixture.

An example of the internal combustion engine achieving such a stratified combustion system is known as a so-called MAN-FM engine. The MAN-FM engine is described in SAE 820760 and SAE 690255 which are well-known technical literatures in automotive and internal combustion engine fields.

Figure 18:
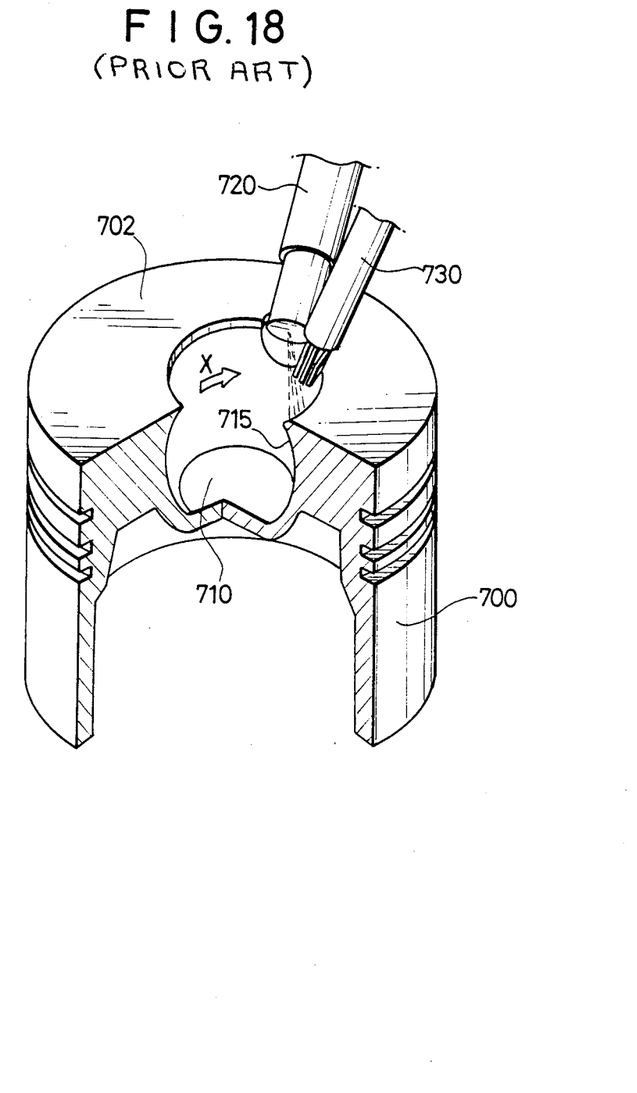
FIG. 18 is a partially cutaway perspective view of the stratified combustion system in the prior art.

FIG. 18 shows an essential part of the MAN-FM engine. Referring to FIG. 18, a combustion chamber 710 formed at a central portion of a piston head 702 of a piston 700. The combustion chamber 710 has a nearly spherical shape. A fuel injection nozzle 720 and a spark plug 730 are so provided as to be directed into the combustion chamber 710. Air is induced into the combustion chamber 710 so as to generate a swirl as shown by an arrow X, and fuel is injected from the fuel injection nozzle 720 toward an inner wall surface 715 of the combustion chamber 710. The swirl of the induced air in the combustion chamber 710 serves to form a radially stratified fuel mixture. The spark plug 730 generates a spark for a long discharge time and applies the same to an optimum fuel mixture layer to be formed at an area near the inner wall surface 715 of the combustion chamber 710, thus carrying out ignition. The combustion is controlled according to a speed of formation of the fuel mixture by the swirl and vaporization of the fuel from the inner wall surface 715 of the combustion chamber 710.

In the fuel supply/ignition device achieving the stratified combustion in the conventional internal combustion engine, the violent swirl generated in the combustion chamber 710 fluctuates a fuel-air ratio of the fuel mixture reaching the spark plug 730. Accordingly, a proper fuel-air ratio cannot be always obtained at an ignition timing to cause unstable ignitability such as ignition failure. Furthermore, as the fuel is injected toward the inner wall surface 715 of the spherical combustion chamber 710, and is expanded along the inner wall surface 715 by the swirl, a fuel film is disadvantageously formed to cause the generation of an unburnt gas. As a result, there occurs another problem of increase in HC in an exhaust gas. Furthermore, as the fuel is injected under a high pressure from the fuel injection nozzle 720 toward the inner wall surface 715 of the combustion chamber 710, a large part of the fuel is deposited onto the inner wall surface 715 to cause deterioration in fuel atomization.

SUMMARY OF THE INVENTION

It is an object of the present invention to provide a fuel supply/ignition device applicable to a stratified combustion system wherein a liquid fuel in a fuel chamber is sprayed into a cylinder by a high-energy spark and is simultaneously ignited.

It is another object of the present invention to provide a fuel supply/ignition device which is improved in a shape of an orifice of a fuel chamber.

It is a further object of the present invention to provide an internal combustion engine utilizing the above-mentioned fuel supply/ignition device.

According to the present invention, there is provided a fuel supply/ignition device comprising a combustion chamber, a fuel chamber formed adjacent to said combustion chamber and having an opening communicated with said combustion chamber, a fuel supply valve for supplying a liquid fuel under pressure into said fuel chamber, a spark plug provided in said fuel chamber, a fuel supply line having a fuel pump and a fuel metering device connected to said fuel supply valve, and a high-energy generator connected through a high-tension cord to said spark plug. Furthermore, there is also provided a novel internal combustion engine employing the above-mentionaed fuel supply/ignition device.

With this construction, when high-energy discharge is generated at the spark plug, the liquid fuel in the fuel chamber is blown up into the combustion chamber, and is burnt in the combustion chamber. At this time, since the spark plug is located near the fuel in the fuel chamber, ignition failure or the like does not occur.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
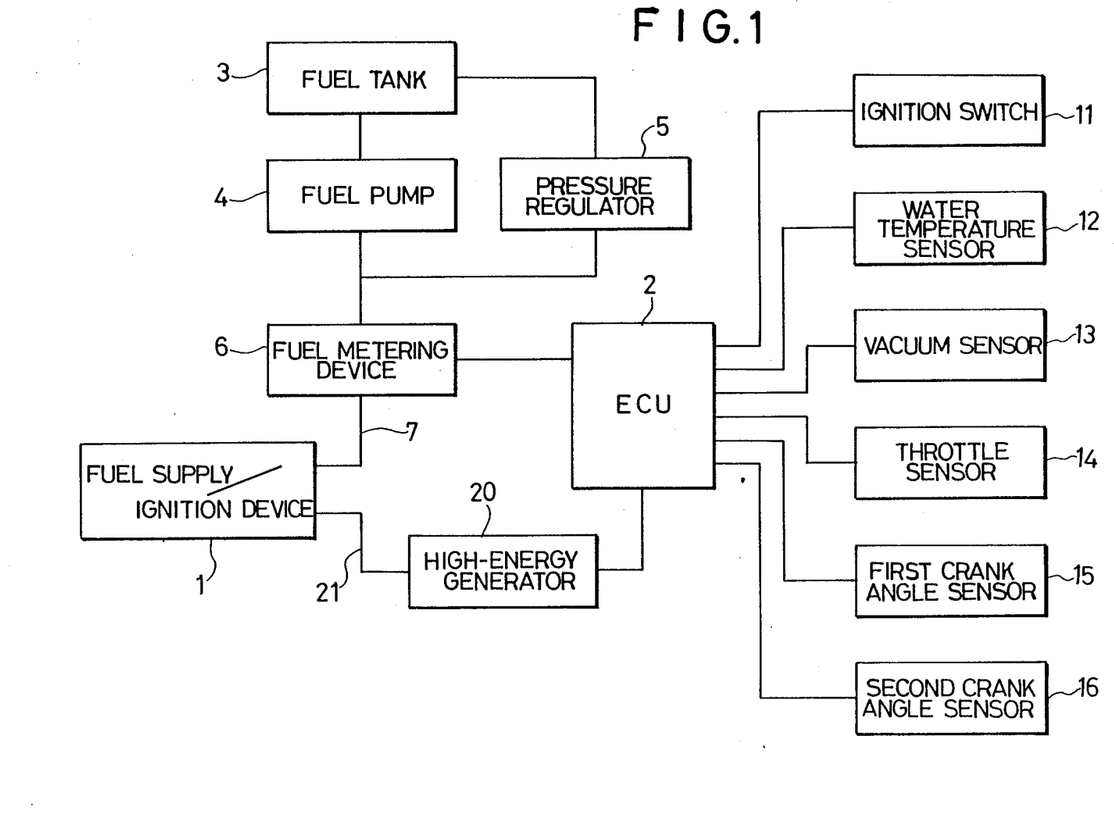
FIG. 1 is a block diagram of the combustion system according to the present invention.

Referring to FIG. 1 which shows a system of the present invention, fuel in a fuel tank 3 is fed to a fuel metering device 6 by a fuel pump 4 with a fuel pressure adjusted to a predetermined pressure by a pressure regulator 5.

The metering device 6 is controlled by an ECU 2 as a contorol device to control a fuel quantity to be supplied according to an engine condition. The fuel metered is fed through a line 7 to a fuel supply/ignition device 1.

The ECU 2 receives data from an ignition switch 11, water temperature sensor 12, vacuum sensor 13, throttle sensor 14, first crank angle sensor 15, second crank angle sensor 16, etc. to detect an engine operational condition and output signals to the metering device 6 and a high-energy generator 20.

Figure 17:
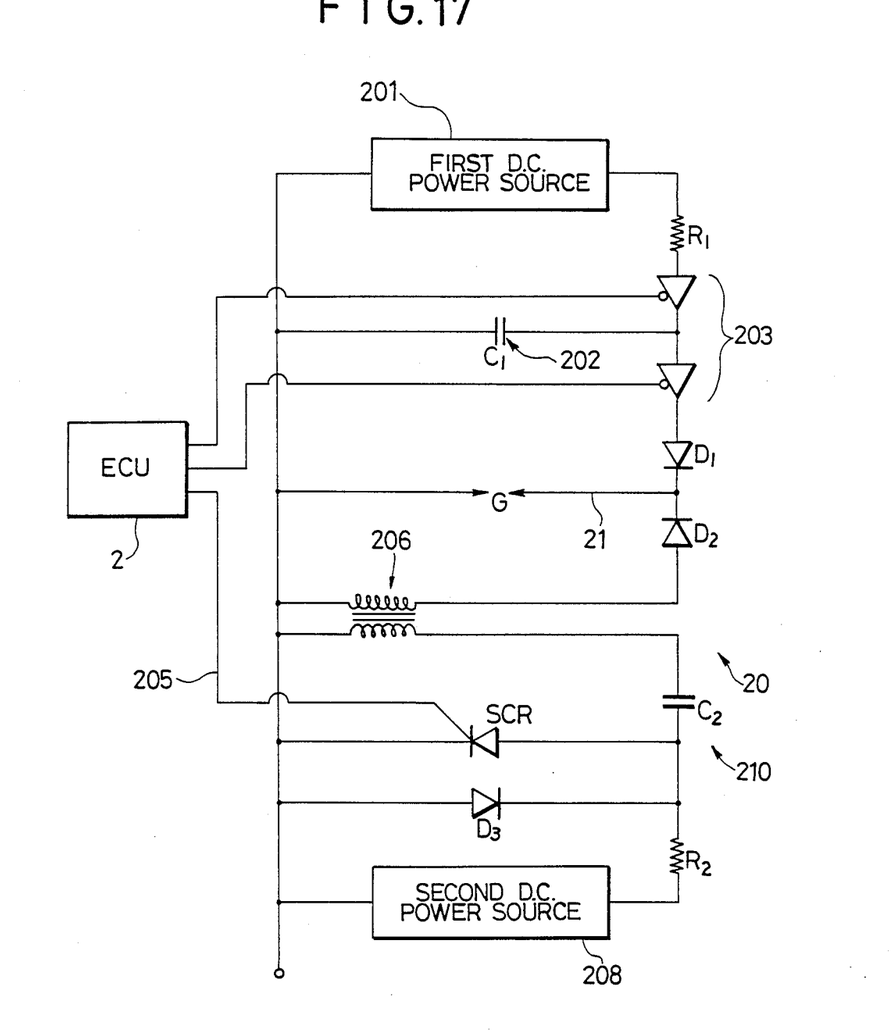
FIG. 17 is a circuit diagram of the high-energy generator according to the present invention.

The high-energy generator 20 has a circuit structure as shown in FIG. 17, for example. Referring to FIG. 17, an electric power is supplied from a D. C. power source 201 through a buffer gate circuit 203 to a capacitor 202 (C1) having a large capacity, which stores a predetermined voltage. The buffer gate circuit 203 is controlled by the ECU 2, wherein when an output from the ECU 2 is in L level, the buffer gate circuit 203 is conductive, while when the output from the ECU 2 is in H level, it is non-conductive. On the other hand, another D. C. power source 208 is provided to charge another capacitor 210 (C2), and when a signal from the ECU 2 is applied to a trigger circuit in a line 205, the capacitor 210 is discharged to a primary side of an ignition coil 206. As a result, a high voltage is generated in a secondary side of the ignition coil 206, and it is fed with the voltage stored in the capacitor 202 (C1) through a high-tension cord 21 to a spark plug of the fuel supply/ignition device 1, thereby causing dielectric breakdown of a gap G of the spark plug and generating high-energy discharge.

In the case that the gap G of the spark plug is provided in the air, the gap is singly provided in the line. However, there is a case that the gap G of the spark plug is provided in a fuel as will be hereinafter described. In this case, an additional gap is provided in the air to prevent leak.

Figure 2:
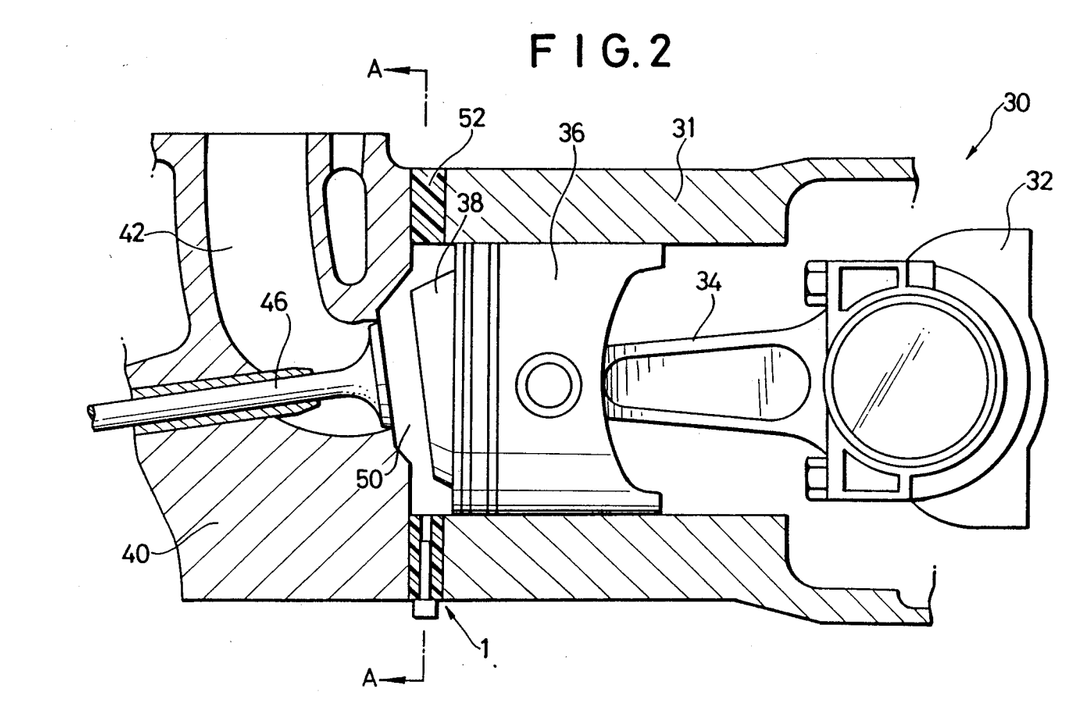
FIG. 2 is a sectional view of a preferred embodiment of the present invention as applied to a horizontal opposed engine.
Figure 3:
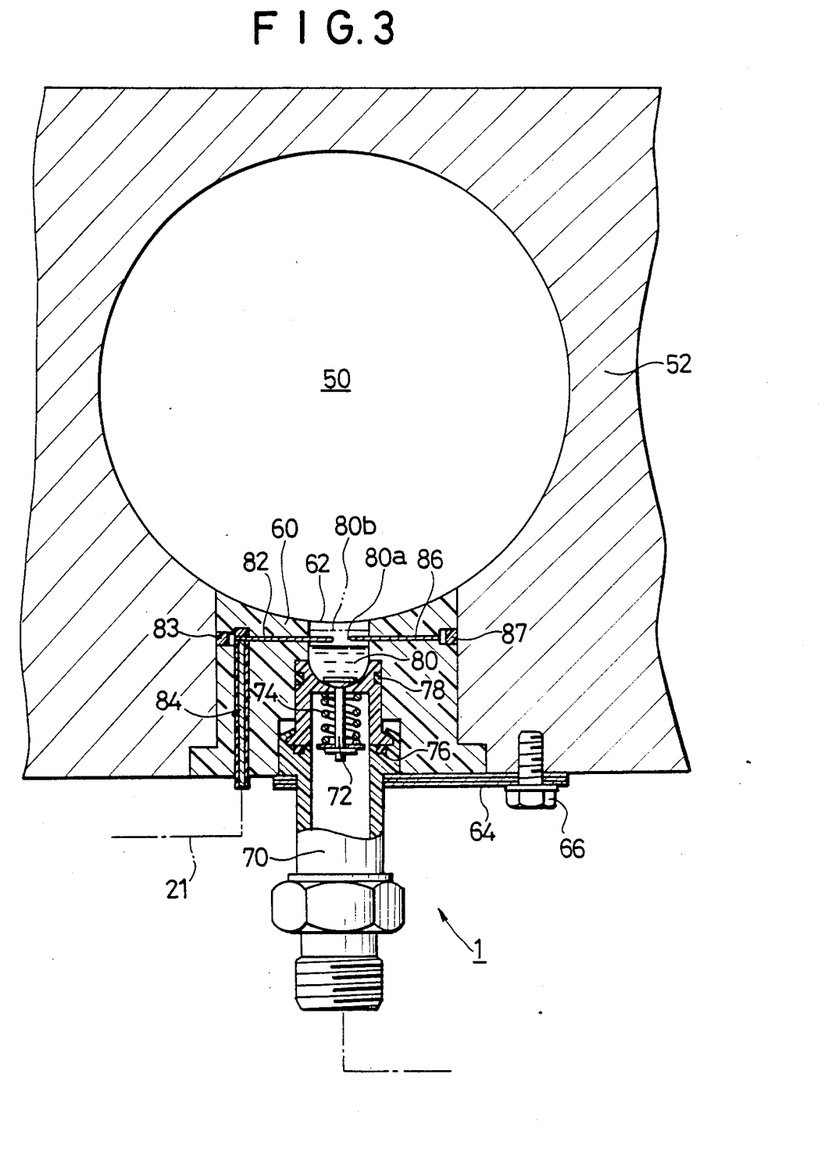
FIG. 3 is a cross section taken along the line A—A in FIG. 2.

Referring to FIGS. 2 and 3 which show a preferred embodiment of the fuel supply/ignition device 1 applied to a horizontal opposed type engine 30, a piston 36 is horizontally slidably inserted in a cylinder block 31, and is connected through a connecting rod 34 to a crankshaft 32. A cylinder head 40 is mounted to the cylinder block 31 so as to be opposed to a piston head 38. The cylnder head 40 is provided with an intake port 42 and an intake valve 46, and there is defined a combustion chamber 50 between the cylinder head 40 and the piston head 38. An intermediate plate 52 forming a part of the cylinder head is interposed between the cylinder block 31 and the cylinder head 40. The fuel supply/ignition device 1 is mounted in the intermediate plate 52.

FIG. 3 is an enlarged sectional view of the fuel supply/ignition device 1. The fuel supply/ignition device 1 is provided with a base 60 fitted with a hole formed through the intermediate plate 52. The base 60 is formed of a heat resisting and electrical insulating material such as ceramics, and it is formed with a cavity 62 opening into the combustion chamber 50. A fuel supply valve 70 is inserted into the base 60 on the opposite side of the combusion chamber 50 with respect to the cavity 62, and is fixed through a plate 64 to the intermediate plate 52 by a bolt 66. The fuel supply valve 70 is provided at its upper end with a valve member 72 adapted to be opened outside. The valve member 72 is normally biased in its closing direction by a spring 74. Seal members 76 and 78 are provided at suitable portions of the fuel supply valve 70. A fuel chamber 80 is defined by the valve member 72 and the cavity 62 in cooperation with each other.

Figures 4, 5A, 5B:
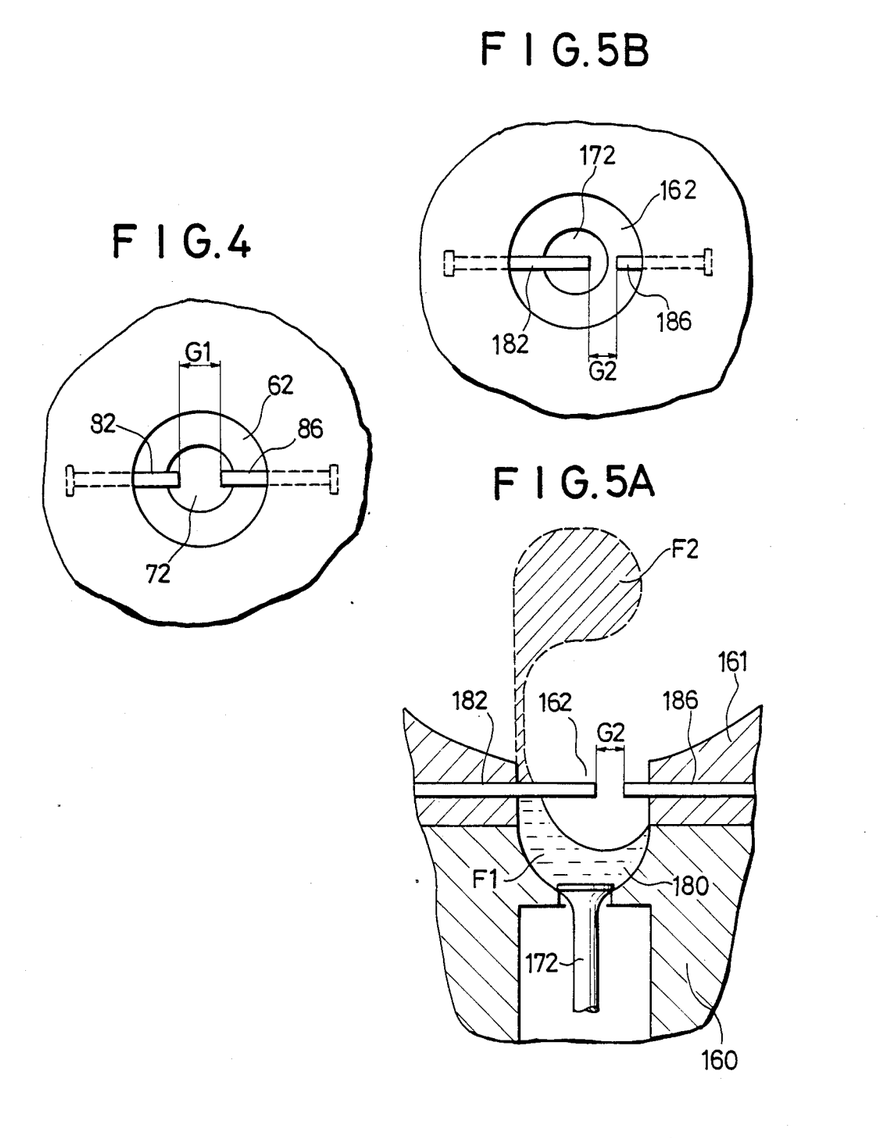
FIG. 4 is a plan view of a cavity and two discharge electrodes shown in FIG. 3.
FIGS. 5A and 5B are plan and sectional views, respectively, of a modified arrangement of the cavity anf the discharge electrodes.

A given quantity of fuel is supplied from the metering device 6 through the line 7 to the fuel chamber 80. A pair of discharge electrodes 82 and 86 are disposed just above a fuel level 80a in the fuel chamber 80. The electrode 82 is insulated from the intermediate plate 52 by an insulating member 83. Another electrode 84 is inserted in the base 60 formed of an insulating material. The electrode 82 is connected through the electrode 84 to the high-tension cord 21 led from the high-energy generator 20. The other electrode 86 is fixed through a conductive member 87 to the intermediate plate 52, and is conductively cinnected through the cylinder block 31 to the ground. FIG. 4 shows the positional relationship among the cavity 62 and the electrodes 82 and 86. As shown in FIG. 4, a gap G1 between the electrodes 82 and 86 is located at the center of the cavity 62.

As shown by a phantom line 80b in FIG. 3, the fuel level in the fuel chamber 80 may be disposed above the electrodes 82 and 86. That is, the gap G1 of the electrodes 82 and 86 may be submerged in the fuel stored in the fuel chamber 80.

The operation of the fuel supply/ignition device 1 as constructed above will now be described with reference to FIGS. 1 to 4.

In a suction stroke of the piston 36, the metering device 6 receives a signal from the ECU 2 to meter a predetermined quantity of fuel and feed the same through the line 7 to the fuel supply valve 70 of the fuel supply/ignition device 1. The fuel fed into the fuel supply valve 70 urges the valve member 72 against the spring 74 by its fuel pressure to open the valve member 72 and flow into the fuel chamber 80. In the case that the fuel pressure is high, the fuel can be supplied to the fuel chamber 80 even in a compression stroke of the piston 36.

At a given crank angle position in the compression stroke of the piston 36, a signal is fed from the ECU 2 to the high-energy genetator 20. The high-energy genetator 20 in turn generates a high voltage to feed the same through the high-tension cord 21 to the discharge electrode 82. As a result, there is generated high-energy discharge at the gap G1 between the electrodes 82 and 86 by the high voltage. That is, a high energy is rapidly discharged at the gap G1 to rapidly expand a peripheral gas. Because of expansion of the peripheral gas, the fuel in the fuel chamber 80 present under the electrodes 82 and 86 is urged down and then blown up along an inner wall surface of the cavity 62 into the combustion chamber 50.

In the case that the electrodes 82 and 86 are submerged in the fuel, the fuel is rapidly expanded by the high energy, and is sprayed into the combustion chamber 50 in the same manner as the above.

Just after dischaging of the high energy at the gap G1, an upper portion of the fuel in the fuel chamber 80 is vaporized by the high energy of the spark, and is diffused with combustion into the combustion chamber 50 enclosing air or lean fuel-air mixture. Such preliminary combustion of the fuel serves as ignition source to burn an injected fuel to be subsequently supplied into the combustion chamber 50. Then, an explosion stroke is carried out.

The course of spraying and ignition of the fuel as mentioned above was confirmed by a high-speed direct photography.

Figure 6A:
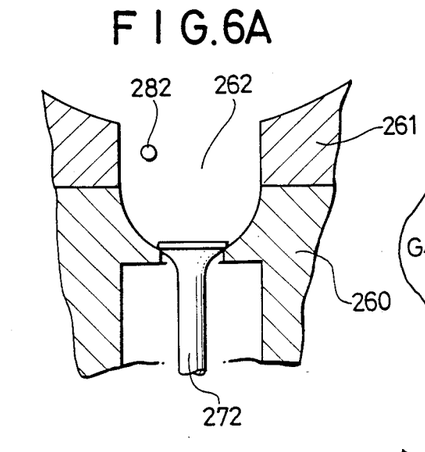
FIGS. 6A and 6B are views similar to FIGS. 5A and 5B, showing a further modification.
Figure 6B:
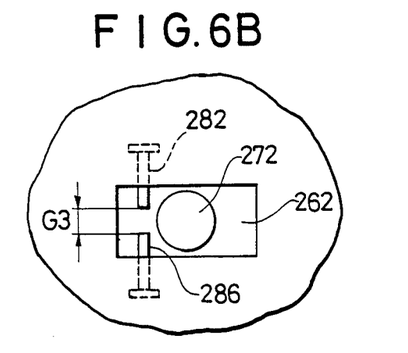
Figure 7A:
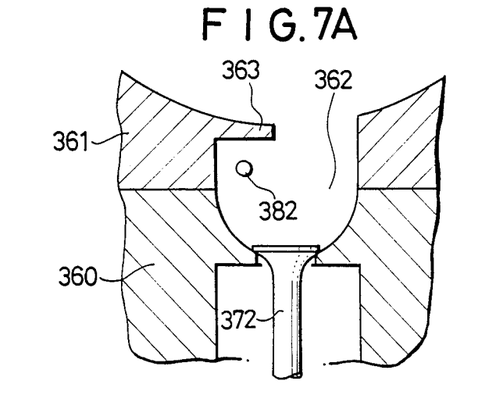
FIGS. 7A and 7B are views similar to FIGS. 6A and 6B, showing a further modification.
Figure 7B:
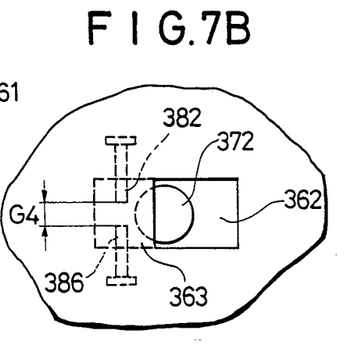

FIGS. 5 to 7 show various modifications of the cavity and the discharge electrodes.

Referring to FIGS. 5A and 5B, the position of the discharge electrodes is modified as compared with the previous preferred embodiment shown in FIGS. 3 and 4. A cavity 162 having a semi-spherical bottom portion is formed in bases 160 and 161 of the fuel supply/ignition device, and a fuel chamber 180 is defined by the cavity 162 and a valve member 172 in cooperation with each other in the same manner as the above preferred embodiment. A discharge electrode 182 is connected to the high-energy generator, and another discharge electrode 186 is connected to the ground. A gap G2 between the electrodes 182 and 186 is disposed at an eccentric position of the avity 162.

When high-energy discharge is generated at the gap G2 between the electrodes 182 and 186, fuel F1 in the fuel chamber 180 is urged down by the high energy, and is raised along an inner wall surface of the cavity 162 on the side apart from the gap G2. As a result, atomized fuel paricles F2 are sprayed into the combustion chamber 150. At the same time, the fuel particles F2 are burnt to be diffused in the combustion chamber 150.

Referring to FIGS. 6A and 6B which show a further modification, a cavity 262 to be formed in bases 260 and 261 has a rectangular shape as viewed in plan, and a fuel chamber is defined by the cavity 262 and a valve member 272. A gap G3 between electrodes 282 and 286 is disposed at an eccentric position of the cavity 262, so as to exhibit a fuel spraying effect similar to that mentioned in FIG. 5.

Referring to FIGS. 7A and 7B which show a further modification, a cavity 362 to be formed in bases 360 and 361 has a rectangular shape as viewed in plan, and a fuel chamber is defined by the cavity 362 and a valve member 372. An upper opening of the cavity 362 is partially covered with a covering portion 363, and a gap G4 between electrodes 382 and 386 is disposed under the covering portion 363 in the cavity 362.

As an upper side of the gap G4 between the electrodes 382 and 386 is covered with the covering portion 363, a discharge energy created at the gap G4 is directed downwardly to raise the fuel along the inner wall surface of the cavity 362 on the opposite side of the covering portion 362. Then, the fuel raised is sprayed from the restricted upper opening of the cavity 362 into the combustion chamber.

The inventors have further investigated the shapes of the cavity and the opening thereof to the combustion chamber to obtain the following results.

Figure 8A:
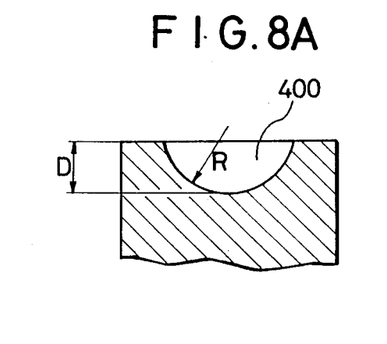
FIGS. 8A and 8B are plan and sectional views of a cavity used in a test.
Figure 8B:
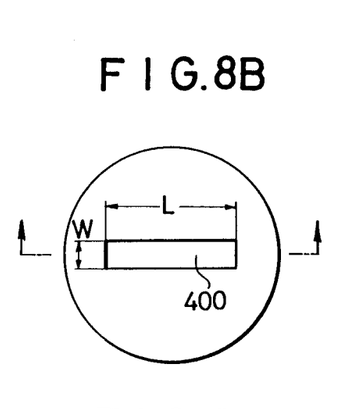

FIGS. 8A and 8B show a geometric shape of a cavity 400 used in the test. The cavity 400 has a dimension of $R=5.5$ mm, $W=2.2$ mm, $L=5.4$ mm, and $D=4.2$ mm. The cavity 400 was connected to a cylinder having a volume of 199 cc to measure a pressure increase in the stratified combustion by the discharging at the gap with use of normal octane as the fuel.

Figure 9A:
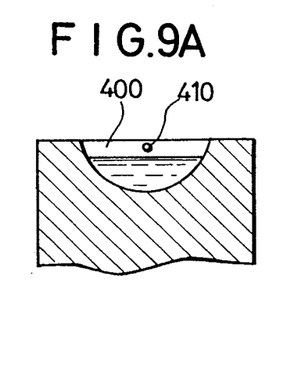
FIGS. 9A and 9B are plan and sectional views of the cavity and dischage electrodes.
Figure 9B:
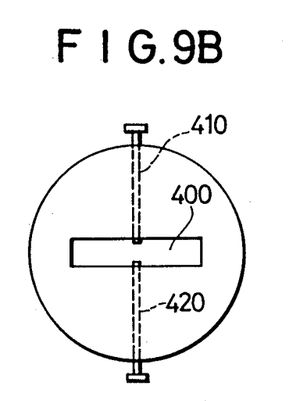

Reforring to FIGS. 9A and 9B, a pair of electrodes 410 and 420 are disposed at a central position of the cavity 400. This construction will be referred to as $A_0$ type.

Figure 10A:
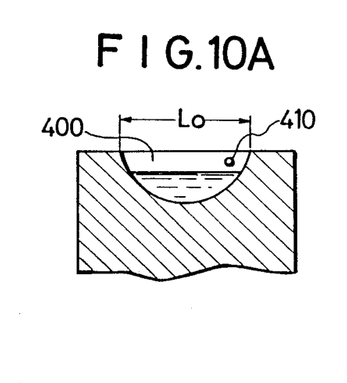
FIGS. 10A and 10B are views similar to FIGS. 9A and 9B, showing a modified arrangement of the cavity and the electrodes.
Figure 10B:
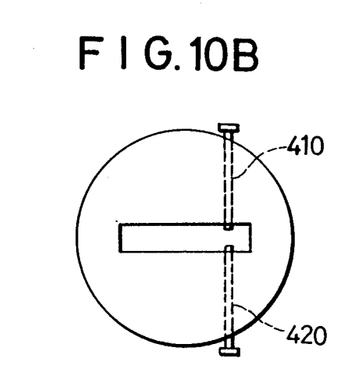

Referring to FIGS. 10A and 10B, the electrodes 410 and 420 are disposed at a position offset from the center of the cavity 400, and an opening ratio $L_0$ of the cavity 400 is set to 100%. This construction will be referred to as $A_1$ type.

Figure 11A:
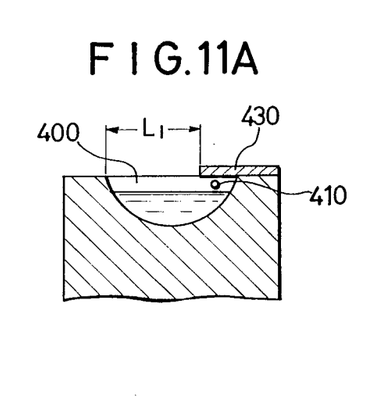
FIGS. 11A and 11B are views similar to FIGS. 10A and 10B, showing addition of a covering member above the electrodes.
Figure 11B:
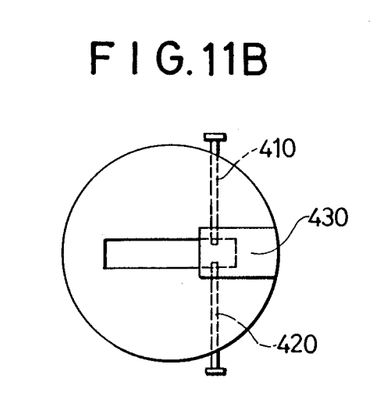

Referring to FIGS. 11A and 11B, a gap between the electrodes 410 and 420 is covered with a plate 430, and an opening ratio L, of the cavity 400 is set to 75%. This construction will be referred to as $A_2$ type.

Figure 12A:
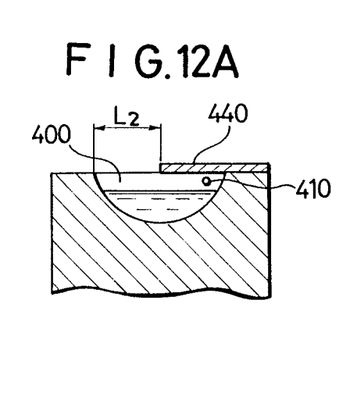
FIGS. 12A and 12B are views similar to FIGS. 11A and 11B, showing a reduction in opening ratio of the upper opening of the cavity.
Figure 12B:
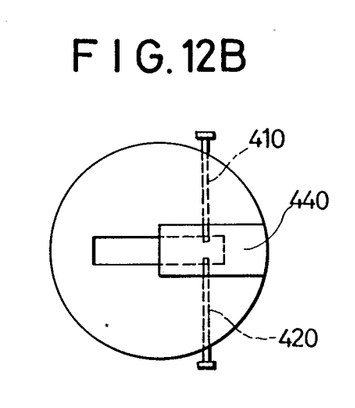

Referring to FIGS. 12A and 12B, the gap between the electrodes 410 and 420 is covered with the plate 440, and an opening ratio $L_2$ of the cavity 400 is set to 50%. This construction will be referred to as $A_3$ type.

Figure 13A:
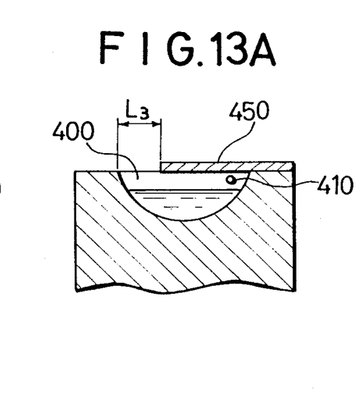
FIGS. 13A and 13B are views similar to FIGS. 12A and 12B, showing a further reduction in the opening ratio.
Figure 13B:
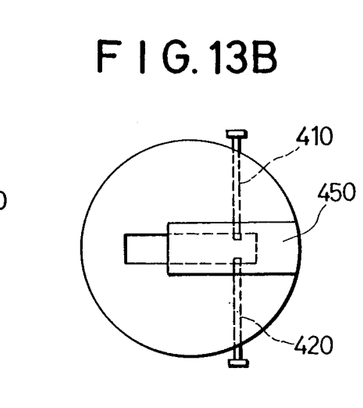

Referring to FIGS. 13A and 13B, the gap between the electrodes 410 and 420 is covered with the plate 450, and an opening ratio $L_3$ of the cavity 400 is set to 25%. This construction will be referred to as $A_4$ type.

Figure 14:
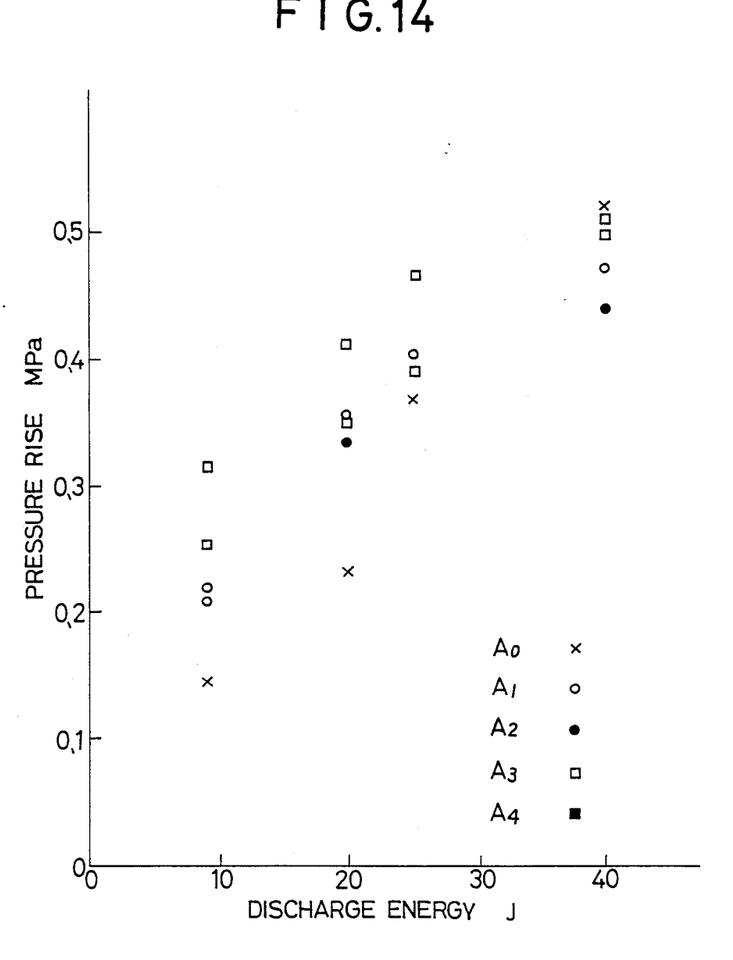
FIG. 14 is a graph illustrating the relationship between a discharge energy and a pressure rise in a cylinder in the case of using the various constructions shown in FIGS. 9 to 13.

FIG. 14 shows the relationship between pressure rise in the cylinder and discharge energy as obtained by using the above-mentioned constructions $A_0$–$A_4$ type. As apparent from FIG. 14, the A4 type can provide a high pressure rise even when the discharge energy is small.

Figure 15:
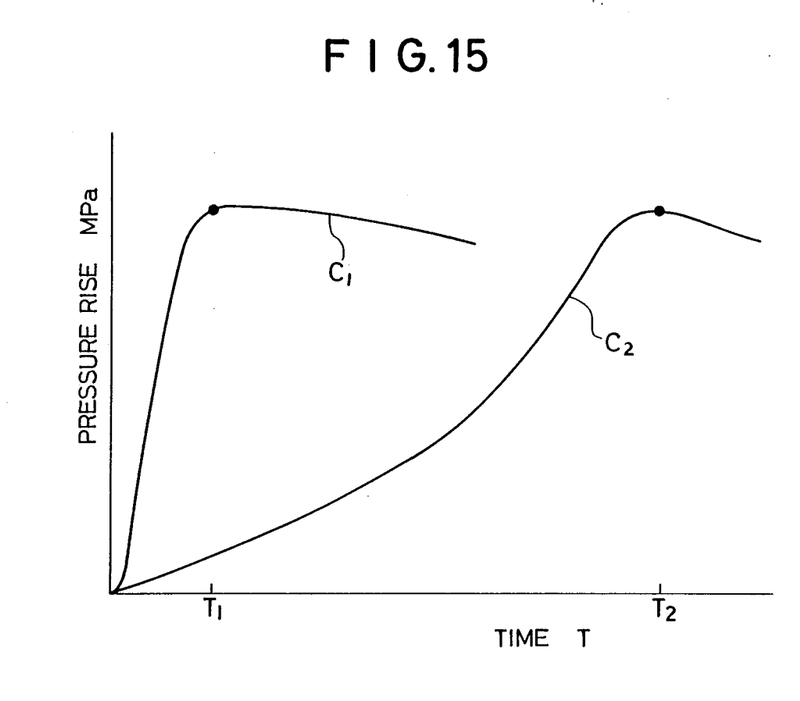
FIG. 15 is a graph illustrating the relationship between an elapsed time and a pressure rise in a cylinder according to the stratified combustion system of the present invention and a pre-mixed gas combustion system in the prior art.

FIG. 15 shows the relationship between pressure rise in the cylinder and time elapsed, comparing the stratified combustion system (curve C1) according to the present invention with the pre-mixed gas combustion system (curve C2) in the prior art wherein a pre-mixed gas is charged into the cylinder to be ignited. As apparent from FIG. 15, the time elapsed $T_1$ (about 10 milliseconds) until a maximum pressure is reached in the curve $C_1$ is shorter than time elapsed $T_2$ (about 60 milliseconds) until a maximum pressure is reached in the curve C2. Thus, it is apparent that the fuel supply/ignition device according to the present invention is more suitable for a high-speed internal combustion engine.

As mentioned above, a most efficient fuel supply/ignition device can be obtained by suitably selecting the shapes of the cavity and the opening thereof to the combustion chamber as well as the location of the gap between the electrodes.

Figure 16:
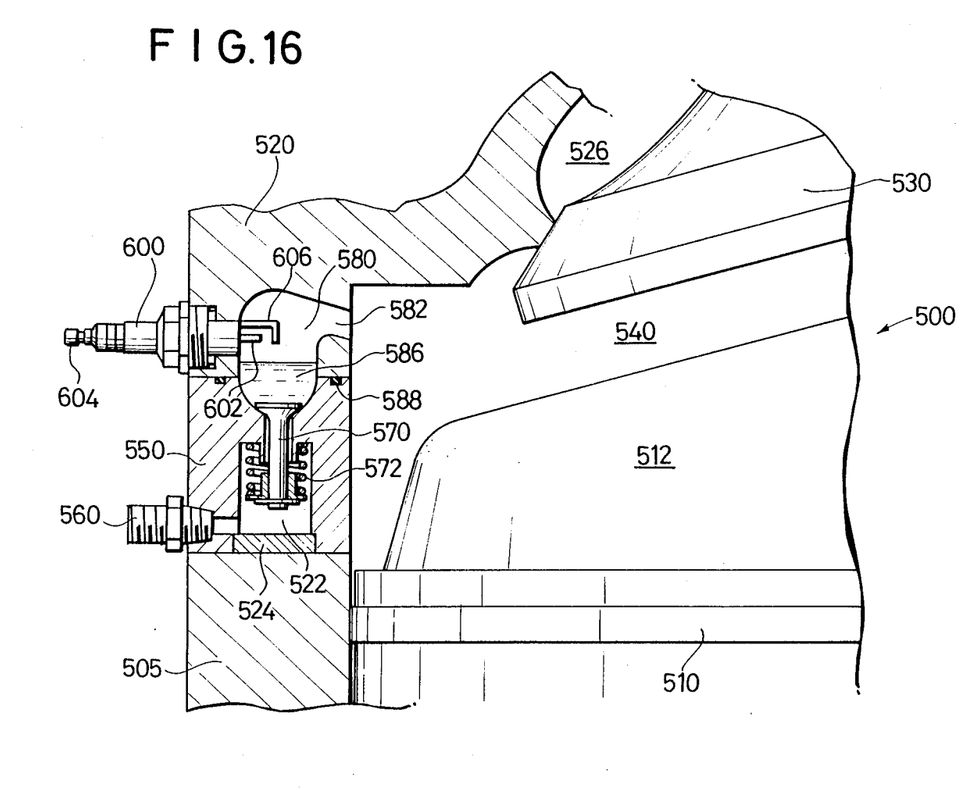
FIG. 16 is a sectional view of another preferred embodiment of the present invention as applied to a vertical type engine.

Referring next to FIG. 16 which shows another preferred embodiment of the present invention applied to an engine having a vertical cylinder, a piston 510 is inserted in a cylinder of a cylinder block 505 of a vertical engine 500, and a cylinder head 520 is mounted on the cylinder block 505 with an intermediate plate 550 interposed therebetween. The cylinder head 520 is formed with an intake port 526, and it is provided with an intake valve 530. A combustion chamber 540 is defined between a piston head 512 of the piston 510 and the cylinder head 520.

The intermediate plate 550 interposed between the cylinder block 505 and the cylinder head 520 is formed with a valve chamber 522 for providing a valve member 570 therein. A cavity 580 is defined above the valve chamber 522, and it is communicated with the combustion chamber 540 through an opening 582. The cavity 580 is also communicated at its bottom with the valve chamber 522, and the valve member 570 is interposed between the cavity 580 and the valve chamber 522. The valve member 570 is normally biased in its closing direction by a spring 572. A fuel chamber 586 is formed at a lower portion of the cavity 580. An oil seal ring 588 is provided between the intermediate plate 550 and the cylinder head 520, so as to ensure liquid sealing of the fuel chamber 586. A filler plug 524 is inserted in a bottom portion of the valve chamber 522, so as to isolate the valve chamber 522 from the cylinder block 505. The valve chamber 522 is formed with a side opening at an outer periphery of the intermediate plate 550, and a fuel supply plug 560 is threadely engaged with the side opening. The fuel supply plug 560 is connected to the fuel supply line 7 as shown in FIG. 1.

A spark plug 600 is mounted above a fuel level in the fuel chamber 586 in the cavity 580. The spark plug 600 has known structure such that it is provided with a body formed of an insulating meterial such as ceramic and a pair of discharge electrodes 602 and 606. The electrode 602 is inserted centrally in the body, and is connected to a terminal 604, while the other electrode 606 is grounded to the cylinder head 520. The terminal 604 of the spark plug 600 is connected to the high-tension cord 21 as shown in FIG. 1.

The operation of the above preferred embodiment will now be described with reference to FIGS. 1 and 16.

In a suction stroke of the piston 510, the metering device 6 receives a signal from the ECU 2 to meter a predetermined quantity of fuel and feed the same through the line 7 to the fuel supply plug 560 of the fuel supply/ignition device 1. The fuel fed through the fuel supply plug 560 into the valve chamber 522 urges the valve member 570 against the spring 572 by its fuel pressure to open the valve member 570 and flow into the fuel chamber 586. In the case that the fuel pressure is high, the fuel can be supplied to the fuel chamber 586 even in a compression stroke of the piston 510.

At a given crank angle position in the compression stroke of the piston 510, a signal is fed from the ECU 2 to the high-energy generator 20. The high-energy generator 20 in turn generates a high voltage to feed the same through the high-tension cord 21 to the spark plug 600. As a result, there is generated high-energy discharge at the gap between the electrodes 602 and 606 by the high voltage. That is, a high energy is rapidly discharged at the gap to rapidly expand a peripheral gas. Because of expansion of the peripheral gas, the fuel in the fuel chamber 586 present under the electrodes 602 and 606 is urged down and then blown up along an inner wall surface of the cavity 580 through the opening 582 into the combustion chamber 540. At this time, a part of the fuel is burnt by the discharge energy, and the combustion is expanded to the injected fuel to be subsequently supplied into the combustion chamber 540.

As mentioned above, the above preferred embodiment can efficiently achieve the fuel supply and ignition.

Although the above preferred embodiment is applied to a low-pressure system using a low fuel pressure, it may be similarly applied to a high-pressure system using a high fuel pressure. Further, although the fuel metering device 6 is controlled by electrical means, it may be controlled by mechanical means.

In summary, as the fuel supply/ignition device according to the present invention blows up the fuel in the vicinity of the electrodes by using a high-energy discharge and simultaneously burns the fuel, a stable ignition performance can be ensured. Furthermore, as the fuel is rapidly sprayed into the combustion chamber by rapid expansion of the gas to be caused by rapid discharge of a high energy at the plug gap, atomization of fuel paricles can be improved, and deposition of the fuel onto the inner wall of the fuel chamber can be reduced, thereby greatly imporving the combustion efficiency.

Moreover, application of the fuel supply/ignition device to an internal combstion engine contributes to improvement in performance of the engine and reduction in harmful components (HC and NOx) in an exhaust gas.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim:

1. A fuel supply/ignition device comprising a combustion chamber, a fuel chamber formed adjacent to said combustion chamber and having an opening communicated with said combustion chamber, a fuel supply valve for supplying a liquid fuel under pressure into said fuel chamber, a spark plug provided in said fuel chamber, a fuel supply line having a fuel pump and a fuel metering device connected to said fuel supply valve, and a high-energy generator connected through a high-tension cord to said spark plug.

2. The fuel supply/ignition device as defined in claim 1, wherein a fuel level of said liquid fuel to be supplied to said fuel chamber is maintained under said spark plug.

3. The fuel supply/ignition device as defined in claim 1 or 2, wherein an energy quantity to be applied to said spark plug is a quantity such that said liquid fuel in said fuel chamber is sprayed into said combustion chamber and simultaneously ignited by a spark to be generated by said spark plug.

4. The fuel supply/ignition device as defined in any one of claims 1 or 2, further comprising a partition wall provided at said opening of said fuel chamber for covering said spark plug and adjusting an opening ratio of said opening of said fuel chamber.

5. The combination of said fuel supply/ignition device as defined in any one of claims 1 or 2 with an internal combustion engine including a cylinder block, a piston to be inserted in said cylinder block, and a cylinder head to be mounted to one end of said cylinder block, said combustion chamber being defined between said piston and said cylinder head.

6. The fuel supply/ignition device as defined in claim 3, further comprising a partition wall provided at said opening of said fuel chamber for covering said spark plug and adjusting an open ratio of said opening of said fuel chamber.

7. The combustion of said fuel supply/ignition device as defined in claim 3 with an internal combustion engine including a cylinder block, a piston to be inserted in said cylinder block, and a cylinder head to be mounted to one end of said cylinder block, said combustion chamber being defined between said piston and said cylinder head.

8. The combustion of said fuel supply/ignition device as defined in claim 4 with an internal combustion engine including a cylinder block, a piston to be inserted in said cylinder block, and a cylinder head to be mounted to one end of said cylinder block, said combustion chamber being defined between said piston and said cylinder head.

* * * * *